United States Patent
Wood

(10) Patent No.: US 7,328,795 B1
(45) Date of Patent: Feb. 12, 2008

(54) CARRYING CASE ASSEMBLY FOR A DRILL AND ITS ASSOCIATED METHOD OF USE

(76) Inventor: Michael D. Wood, 105 Fairacres Dr., Lansdale, PA (US) 19446

(*) Notice: Subject to any disclaimer, the term of this patent is extended or adjusted under 35 U.S.C. 154(b) by 321 days.

(21) Appl. No.: 10/944,648

(22) Filed: Sep. 20, 2004

Related U.S. Application Data

(63) Continuation-in-part of application No. 10/850,916, filed on May 24, 2004.

(51) Int. Cl.
   *B65D 85/28* (2006.01)
(52) U.S. Cl. .................................. 206/373; 206/379
(58) Field of Classification Search ............. 206/349, 206/372, 373, 376, 379, 736, 756, 758, 764
   See application file for complete search history.

(56) References Cited

U.S. PATENT DOCUMENTS

| | | | |
|---|---|---|---|
| 3,578,153 A | 5/1971 | Olson | 206/17 |
| 5,339,956 A | 8/1994 | Thomason | 206/372 |
| 5,533,843 A | 7/1996 | Chung | 408/241 |
| 6,493,217 B1 * | 12/2002 | Jenkins, Jr. | 361/683 |

* cited by examiner

*Primary Examiner*—Shian T. Luong
(74) *Attorney, Agent, or Firm*—LaMorte & Associates

(57) ABSTRACT

A carrying case assembly for a drilling tool and the method of interconnecting the carrying case with the drilling tool. The carrying case defines an internal area with a least one first vertical side. A press mechanism is attaches to the vertical side of the carrying case. The press mechanism includes a geared element, wherein said geared element partially extends through the first vertical side of the case. A guide bracket is provided that includes a sliding element, a section of gear rack and a drill mounting clamp. The sliding element engages the first vertical side of the case and enables the sliding element to reciprocally move along the first vertical side of the case. The section of gear rack engages the geared element. As such, when the geared element is rotated, the sliding element is caused to move.

12 Claims, 5 Drawing Sheets

CARRYING CASE ASSEMBLY FOR A DRILL AND ITS ASSOCIATED METHOD OF USE

RELATED APPLICATIONS

This application is a continuation-in-part of U.S. patent application Ser. No. 10/850,916, filed May 24, 2004, entitled Carrying Case Assembly For A Power Tool And Its Associated Method Of Use.

BACKGROUND OF THE INVENTION

1. Field of the Invention

In general, the present invention relates to carrying cases that hold power tools. More particularly, the present invention relates to carrying cases for power drilling tools that have secondary features that complement the functionality of the drilling tool.

2. Description of the Prior Art

There are many different types of power hand tools. Many power hand tools are sold in cases that can be used to carry the tool. A carrying case for a power hand tool typically has a main compartment that is sized to receive the power tool itself. The carrying case may also have secondary compartments for holding the bits, blades, cords or batteries that are used by the power hand tool. The carrying case for a power hand tool protects the tool and makes the tool easier to transport. Furthermore, by holding accessories for a power tool in the carrying case, those accessories are transported with the power tool. This makes it easy for the power tool to be conveniently adjusted, or have its cutting blade changed.

Prior art power tool carrying cases that carry both a power tool and the accessories for that power tool are exemplified in U.S. Pat. No. 3,578,153 to Olsen, entitled Drill Holder Device, which shows a carrying case for a drill and a holder for different drill bits within the same carrying case.

In the prior art, the carrying case for a tool rarely has any secondary function other than to hold a power tool and the accessories commonly used in association with the power tool. Typically, any such specialized carrying case would only provide a medium to power the tool being carried. For instance, in U.S. Pat. No. 5,533,843 to Chung, entitled, Electric Hand Drill Set, the carrying case of a power drill is described that plugs into an electrical outlet. The carrying case then recharges a battery operated drill when the drill is stored within the carrying case.

In U.S. Pat. No. 5,339,956 to Thomason, entitled Tool Box With Combined Elements, a tool carrying case is provided that contains an internal power extension cord. In this manner, the carrying case can be used as the medium to power any power tool carried in the carrying case.

Hand held power tools are often stored and carried in carrying cases for convenience. Since hand held tools are guided by a user's hand, such tools are good for general work. However, instability inherent in a hand held tool often makes those tools poorly suited for precise work. If precision is needed in working some material, that material is typically taken to a corresponding bench top tool. Bench top tools rest on stable platforms and do not rely on the steadiness of a user's hand in their operation. For example, if holes have to be precisely drilled in a piece of metal at exact points, a person typically would not be able to achieve such precision with a handheld drill. Rather, the piece of metal would be taken to a drill press that can drill such precise holes.

Recognizing that sometimes precision is important, there exist many types of accessories for hand tools that increase the precision of the hand tool and cause the hand tool to perform more like a bench mounted tool. For example, router tables exist for routers that hold the routers in an exact position as wood is passed across the router's bit. Similarly, drill guides exist for hand held drills that ensure the drill bit is straight as it drills through material. Auxiliary guides also exist for circular saws, saber saws and most other cutting tools. However, such accessory guides are typically bought separately from the power tool and most often cannot be stored in the carrying case of the power tool. The use of such accessory guides is, therefore, often both time consuming and inconvenient Although various carrying cases do exist for tools that provide power to the tools, prior art carrying cases have not been configured as an accessory to a power tool so that the power tool can be used with more precision. The need therefore exists for a carrying case for a power tool that can be attached to the power tool to increase the precision and stability of the power tool. This need is met by the present invention as claimed and described below.

SUMMARY OF THE INVENTION

The present invention is a carrying case assembly for a drilling tool and the method of interconnecting the carrying case with the drilling tool when the tool is in use. The carrying case defines an internal area large enough to store the drilling tool when the tool is not in use. The case has a least one first vertical side. A press mechanism is selectively attachable to the vertical side of the carrying case. The press mechanism includes a geared element supported within the case, wherein said geared element partially extends through the first vertical side of the case.

A guide bracket is provided that includes a sliding element, a section of gear rack and a drill mounting clamp. The sliding element engages the first vertical side of the case in a manner that enables the sliding element to reciprocally move along the first vertical side of the case. The section of gear rack engages the geared element. As such, when the geared element is rotated, the sliding element is caused to move. The drill mounting clamp engages the drilling tool and attaches the tool to the sliding element.

A manual control, such as a handle or knob, is provided that is coupled to the geared element. The manual control is used to selectively turn the geared element, therein causing the sliding element to reciprocally move relative the first vertical side of the case. Consequently, by moving the manual control, the drilling tool on the sliding element can be caused to move, thereby causing the drilling tool and case assembly to function as a drill press.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention carrying case system can be used to carry most any type of portable drill-like tools, such as corded electric drills, pneumatic drills and spiral saws, the carrying case system is best suited for use in carrying a battery powered cordless drill. Accordingly, by way of example, the present invention carrying case system will be illustrated and described in use with a cordless drill to set forth the best mode contemplated for the invention. However, such a selected embodiment should not be considered a limitation to the carrying case system and its application to other types of drills and spiral saws not specifically illustrated.

Figure 1:
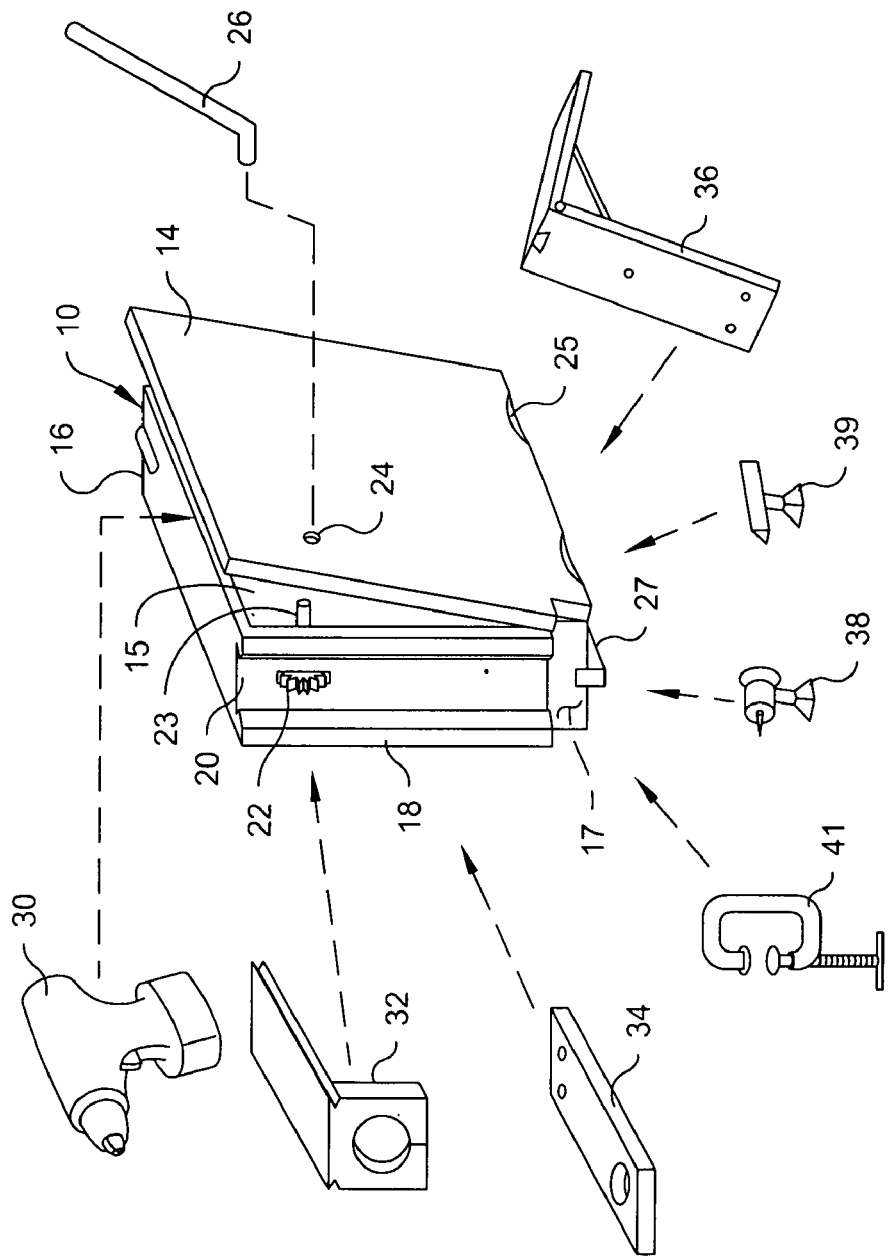
FIG. 1 is an open perspective view of a carrying case with an exploded view of the selected power tools and accessories that may be contained within the carrying case.

Referring to FIG. 1, there is shown a first embodiment of a carrying case 10 in accordance with the present invention. The carrying case 10 is a rigid case having generally flat side surfaces. At least one handle 12 is provided so that the carrying case 10 can be easily lifted and carried. The carrying case 10 has a side panel door 14 that enables the interior region 15 of the carrying case 10 to be easily accessed. The interior region 15 defined by the carrying case 10 is large enough to hold a drill 30 and its accessories when the drill 30 is not in use.

The carrying case 10 is formed with a recessed region 17 at the corner of the bottom edge. Thus, the carrying case 10 has a long vertical side 16 and a short vertical side 18. The purpose of the recessed region 17 below the short vertical side 18 of the carrying case 10 is later described.

The short vertical side 18 of the carrying case 10 defines at least one guide slot 20 that runs along the length of the exterior of the short vertical side 18. Furthermore, the teeth of a pinion gear 22 extend into the guide slot 20 through a hole that leads into the interior region 15 of the carrying case 10. The pinion gear 22 within the carrying case 10 rotates about a shaft 23. The shaft 23 communicates with an access hole 24 on the side door panel 14 of the carrying case 10. A handle 26 is provided within the carrying case 10. The handle 26 is sized to extend into the access hole 24 and engage the pinion gear shaft 23. Consequently, the pinion gear 22 is turned by rotating the handle 26.

Along the base of the carrying case 10 are disposed clamping recesses 25. The clamping recesses 25 are used to mount the carrying case 10 to a tabletop or other support structure, as will later be described. Additionally, a clamping rail 27 can be attached to the bottom of the carrying case 10. The clamping rail 27 provides a surface that can be engaged by a vise and therefore provides a means to attach the carrying case 10 to a tabletop.

The carrying case 10 defines an interior region 15 that is used to hold a drill 30 and various accessories. One important accessory is a guide bracket 32. The guide bracket 32 mounts to the body of the drill 30 in a manner that is later more fully described.

Also contained within the carrying case 10 are a work support plate 34, an auxiliary platform 36, a lathe tailstock 38, a lathe tool rest 39 and mounting clamps 41. The purpose of these elements will be later described.

Figure 2:
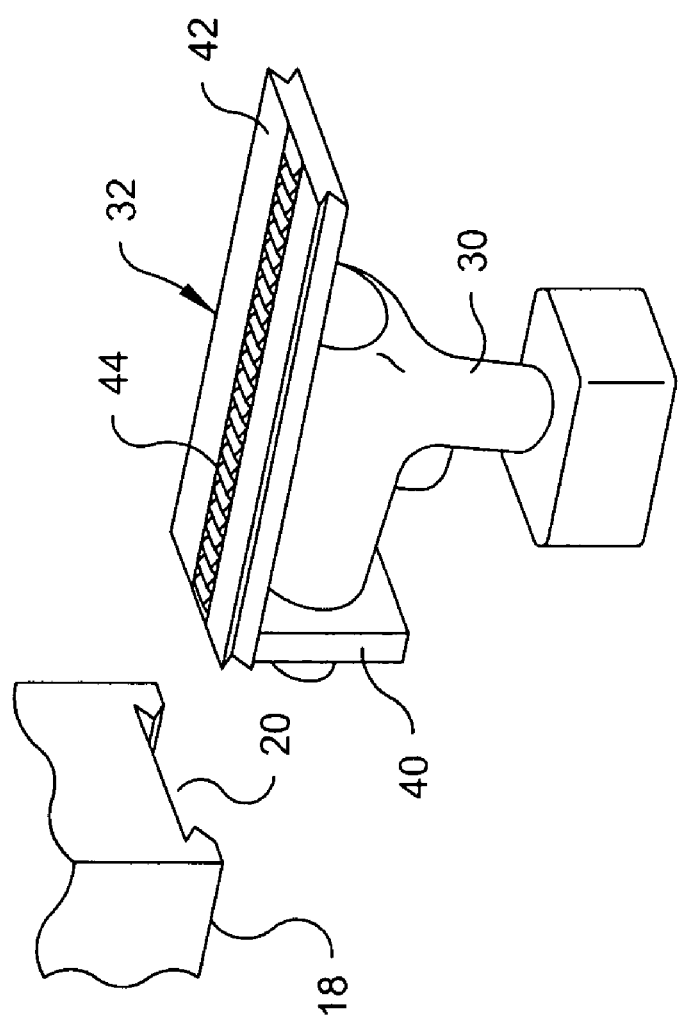
FIG. 2 is a perspective view of an exemplary embodiment of the guide bracket shown in FIG. 1.

Referring now to FIG. 2, an exemplary embodiment of the guide bracket 32 is shown. The guide bracket 32 includes an annular clamp 40 that attaches around the housing of the drill 30. The annular clamp 40 supports a straight sliding element 42 along the top of the drill 30. The straight sliding element 42 has a complex shape that engages the guide slot 20 formed in the short vertical side 18 of the carrying case 10. Thus, the sliding element 42 can pass into the guide slot 20 and reciprocally move along the length of the guide slot 20 while still supporting the drill 30.

A linear gear rack 44 is formed along one side of the straight sliding element 42. The linear gear rack 44 is engaged by the pinion gear 22 (FIG. 1) when the sliding element 42 is placed within the guide slot 20 on the short vertical side 18 of the carrying case 10. As a result, when the pinion gear 22 is turned, both the guide bracket 32 and the drill 30 it supports are caused to move laterally along the guide slot 20 on the short vertical side 18 of the carrying case 10.

In the shown embodiment the guide bracket 32 is shown as a separate element that attaches to the drill 30. It will be understood that the features of the guide bracket 32 can be directly manufactured into the housing of the drill 30. Thus, the drill and guide bracket can be an integral unit rather than a two part assembly.

Figure 3:
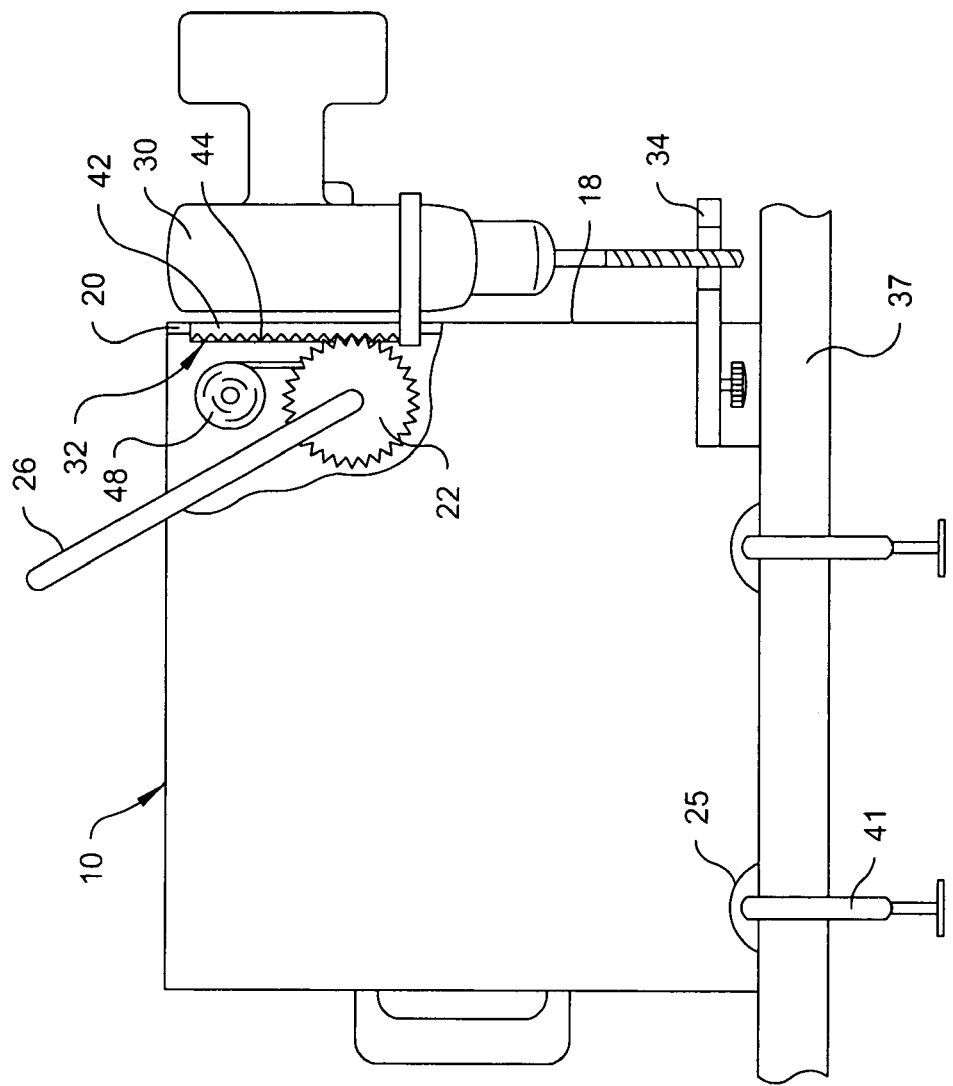
FIG. 3 is a selectively cross-sectioned view of the exemplary carrying case being configured as a drill press.

Referring to FIG. 3, an embodiment of the carrying case system is shown where the carrying case 10 is used to create a drill press using the cordless drill 30. A cordless drill 30 and its accessories can be carried in the carrying case 10, wherein the cordless drill 30 can be removed from the carrying case 10 and used as needed. However, the carrying case 10 can also engage the portable drill 30 and add to the performance of the portable drill 30 by creating a drill press. Such an embodiment is set forth in FIG. 3. In FIG. 3, it can be seen that the guide bracket 32 is attached to the drill 30. The sliding element 42 of the guide bracket 32 is then placed within the guide slot 20 on the short vertical side 18 of the carrying case 10. Once the sliding element 42 of the guide bracket 32 is advanced into the guide slot 20, the pinion gear 22 engages the linear gear rack 44 formed on the guide bracket 32. Within the confines of the carrying case 10, the pinion gear 22 is attached to a coil spring 48. The coil spring 48 biases the pinion gear 22 into a set position and resists the rotation of the pinion gear 22 against that spring bias. The resistance provided by the coil spring 48 is slightly greater than the combined weight of the drill 30 and guide bracket 32. Accordingly, when the guide bracket 32 and drill 30 are attached to the guide slot 20 on the short vertical side 18 of the carrying case 10, the coil spring 48 prevents gravity from pulling the guide bracket 32 and drill 30 to the lowest position. Rather, since the resistance provided by the coil spring 48 is slightly greater than the combined weight of the guide bracket 32 and the drill 30, both the guide bracket 32 and the drill 30 are held at the highest point in the guide slot 20.

The handle 26 is inserted into the hole 24 (FIG. 1) on the side panel door 14. The handle 26 engages the pinion gear 22 and causes the pinion gear 22 to turn when the handle 26 is rotated. Thus, by selectively rotating the handle 26, the guide bracket 32 and the drill 30 can be caused to move against the bias of the coil spring 48 and travel down along the guide slot 20 on the short vertical side 18 of the carrying case 10. The guide bracket 32 and drill 30 can therefore be made to have the same motion as a drill press.

A support plate 34 is attached to the bottom of the short vertical side 18 of the carrying case 10. The support plate 34 is held above the ground due to the recessed area 17 under the short vertical side 18. The support plate 34 holds work under the drill 30 within its range of motion. Thus, by placing a work piece on the support plate 34, the drill 30 can be advanced against that work piece as though it were in a traditional drill press.

In the embodiment of FIG. 3, the carrying case 10 is being clamped to a tabletop 37. This is achieved through the use of C-clamps 41 that pass over the tabletop 37 and engage the clamping recesses 25 formed along the bottom of the carrying case 10.

Figure 4:
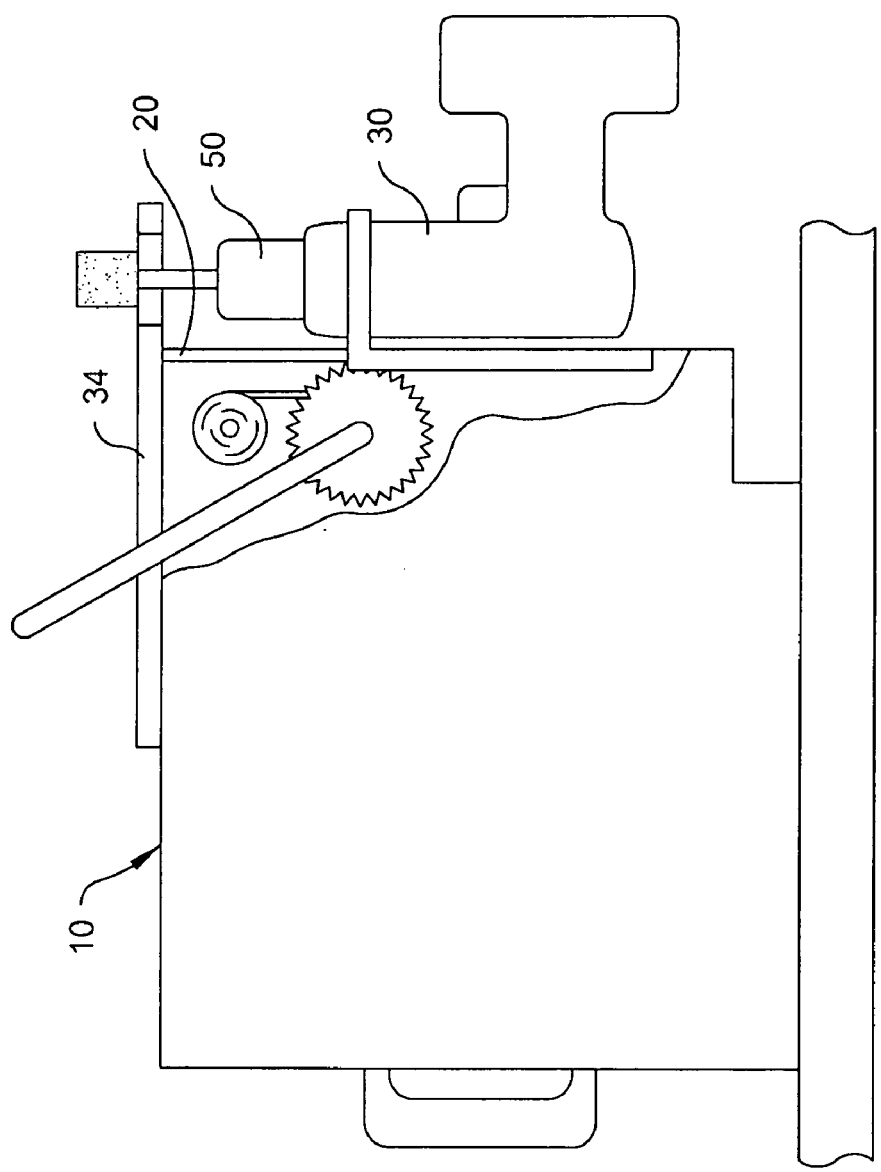
FIG. 4 is a selectively cross-sectioned view of the exemplary carrying case being configured as a sander.

Referring to FIG. 4 it can be seen that the sliding bracket 42 and drill 30 can be attached to the guide slot 20 in an orientation opposite that shown in FIG. 3. In the embodiment of FIG. 4, the drill 30 is oriented to face upwardly rather than downwardly. The support plate 34 can then be attached to the top surface of the carrying case 10. In such a configuration, the drill 30 can be used as an oscillating sander. A sanding head or grinding head is set into the chuck 50 of the drill 30. By moving the handle 26, the sanding head or grinding head can be caused to move up and down. Thus, any work piece placed on the support plate 34 will be acted upon by the sanding head in the same manner as it would be if placed on a traditional oscillating sanding machine.

Figure 5:
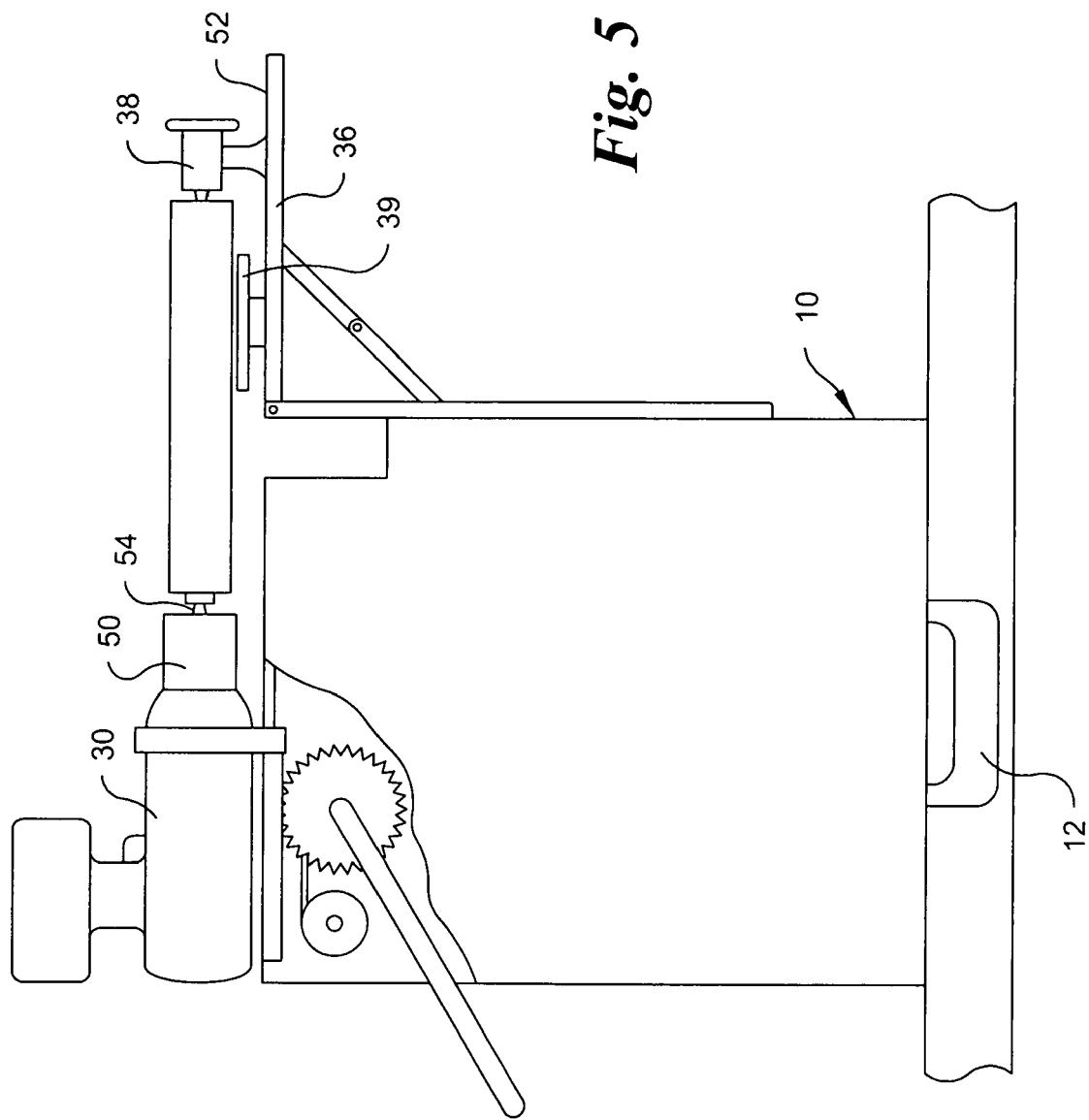
FIG. 5 is a selectively cross-sectioned view of the exemplary carrying case being configured as a lathe.

Referring to FIG. 5, an alternate embodiment is shown where a carrying case 10 is used to orient the drill 30 to create a lathe. In the embodiment of FIG. 5, an auxiliary platform 36 is attached to the carrying case 10. The platform 36 attaches to the bottom surface of the carrying case 10. The platform 36 has a work surface 52 that lay in the same plane as the rotating axis of the drill 30. However, the work surface 52 of the platform 36 can be selectively adjusted in height relative to the rotating axis of the drill 30.

If a sanding disk (not shown) were attached to the drill 30, the drill 30 could again be used as a sander. However, in the shown embodiment, a lathe tailstock 38 and a tool rest 39 are attached to the work surface 52 of the platform 36. A center spur 54 is set into the chuck 50 of the drill 30. The lathe tailstock 38 is attached to the platform 36 in line with the center spur 54. A piece of wood can be set between the center spur 54 and the lathe tailstock 38. When the drill 30 turns, the wood would turn as though it were in a lathe. The tool rest 39 is positioned next to the rotating wood. Conventional lathe cutting tools can then be used to shape the rotating wood.

In the embodiment of FIG. 5, the handle 12 is used to attach the carrying case 10 to a workbench. Many commercially available work benches have a vise clamp built into the top of the workbench. The handle 12 acts as a clamping rail for the carrying case 10. Thus, the handle 12 provides a structure that can be engaged by such a vise clamp. In this manner, C-clamps need not be used to attach the carrying case 10 to a workbench.

In the shown embodiments, the drill is mounted to the same side of the carrying case. It will be understood that the shape of the carrying case is a matter of design choice and the drill can be made to attach to any side of the carrying case.

Furthermore, the embodiment of the drill illustrated in this specification is merely exemplary. Many different types of drilling tools exist other than have been illustrated. For example, spiral saws can be used in place of the drill. It will be understood that the present invention carrying case system can be adapted for use with any drilling tool. All such variations, modifications and alternate embodiments are intended to be included within the scope of the present invention as defined by the appended claims.

What is claimed is:

1. A carrying case assembly for a drilling tool, comprising:
   a case having a plurality of sides that includes a first side surface, wherein said case defines an internal area large enough to store the drilling tool;
   a geared element supported within said case, wherein said geared element partially extends through said first side surface of said case;
   a guide bracket that includes a sliding element, a gear rack and a clamp, wherein said sliding element engages said first side surface of said case in a manner that enables said sliding element to reciprocally move along said first side surface of said case, said gear rack engages said geared element, and said clamp connects said guide bracket to said drilling tool; and
   a handle coupled to said geared element for selectively turning said geared element, therein causing said sliding element to reciprocally move relative said first side surface of said case.

2. The assembly according to claim 1, wherein said guide bracket is selectively detachable from said first side surface of said case and is storable within said internal area of said case.

3. The assembly according to claim 1, further including a counterbalance spring coupled to said geared element for biasing said geared element into a set orientation.

4. The assembly according to claim 3, wherein said guide bracket and said drilling tool have a combined weight that applies a predetermined force to said geared element, and wherein said counterbalance spring applies a counter balancing force to said geared element that is greater than said predetermined force.

5. The assembly according to claim 1, wherein said case has a top surface and a bottom surface and said first side surface extends from said top surface toward said bottom surface but terminates a predetermined distance above said bottom surface.

6. The assembly according to claim 1, wherein a guide slot is disposed in said first side surface of said case, wherein said sliding element of said guide bracket passes within said guide slot.

7. The assembly according to claim 1, further including a support plate that can be selectively attached to said case, wherein said support plate intersects said first side surface at a perpendicular.

8. The assembly according to claim 1, further including a platform that selectively attaches to said case, wherein said platform has a work surface that lays in a plane parallel to said first side surface.

9. The assembly according to claim 8, wherein said work surface of said platform is selectively adjustable in position relative said first side surface of said case.

10. The assembly according to claim 8, further including a lathe tailstock that is selectively attachable to said work surface of said platform.

11. A carrying case assembly for a portable drill, comprising:
    a case having a flat side surface, wherein said case defines an interior large enough to retain a portable drill;
    a press mechanism disposed on said side surface of said case, wherein said press mechanism includes a reciprocating slide, a drill mounting clamp supported by said reciprocating slide and a manual control for selectively controlling movement of said reciprocating slide.

12. The assembly according to claim 11, wherein said reciprocating slide, said drill mounting clamp and said manual control are selectively detachable from said case and are storable within said case with said drill.

* * * * *